United States Patent

Tomihashi et al.

[11] Patent Number: 5,422,145
[45] Date of Patent: Jun. 6, 1995

[54] FLUORORUBBER-CONTAINING POWDER COATING COMPOSITION

[75] Inventors: Nobuyuki Tomihashi; Masafumi Akamatsu, both of Osaka; Yutaka Ueta, Kawanishi, all of Japan

[73] Assignee: Daikin Industries, Ltd., Osaka, Japan

[21] Appl. No.: 186,704

[22] Filed: Jan. 25, 1994

Related U.S. Application Data

[60] Division of Ser. No. 66,933, May 25, 1993, Pat. No. 5,340,864, which is a continuation of Ser. No. 701,344, May 9, 1991, abandoned, which is a continuation of Ser. No. 481,184, Feb. 20, 1990, abandoned, which is a continuation of Ser. No. 273,983, Nov. 21, 1988, abandoned.

[30] Foreign Application Priority Data

Nov. 26, 1987 [JP] Japan ................. 62-298524

[51] Int. Cl.$^6$ ............................... B05D 1/22
[52] U.S. Cl. ................... 427/459; 427/461; 427/485; 427/486; 427/185; 427/195
[58] Field of Search ............... 427/459, 461, 485, 486, 427/185, 195

[56] References Cited

U.S. PATENT DOCUMENTS

| | | | |
|---|---|---|---|
| 4,154,876 | 5/1979 | Segawa et al. | 427/195 |
| 4,599,370 | 7/1986 | Grossman et al. | 523/200 |
| 4,774,102 | 9/1988 | Kiefer et al. | 427/26 |

OTHER PUBLICATIONS

Rideout D. S., "Power Coatings" Kirk-Othmer Ency of Chem Tech, 3rd Ed. 19, John Wiley (1982) pp. 1–27.
Textbook of Fred W. Billmeyer, Jr., *Polymer Science, Structures and Properties of Polymers*, pp. 198–205.

*Primary Examiner*—Robert E. Sellers
*Assistant Examiner*—Mark D. Sweet
*Attorney, Agent, or Firm*—Birch, Stewart, Kolasch & Birch

[57] ABSTRACT

A fluororubber-containing powder coating composition comprising a fluororubber, an adhesion-preventing material and optionally a cross-linking agent, which composition has an particle size of 10 to 2,000 μm and an apparent density of at least 0.2 g/cc, which provides a homogeneous smooth coated film having no or only a small amount of bubbles.

12 Claims, No Drawings

FLUORORUBBER-CONTAINING POWDER COATING COMPOSITION

This application is a divisional of copending application Ser. No. 08/066,933, filed on May 25, 1993 now U.S. Pat. No. 5,340,864, which is a Rule 62 Continuation of 07/701,344 filed May 9, 1991, which is a Rule 62 Continuation of 07/481,184 filed Feb. 20, 1990, which is a Rule 60 Continuation of 07/273,983 filed Nov. 21, 1988, all now abandoned, the entire contents of all of which are hereby incorporated by reference.

BACKGROUND OF THE INVENTION

1. Field of the Invention

The present invention relates to a fluororubber-containing powder coating composition. More particularly, the present invention relates to a powder coating composition comprising a fluororubber, an adhesion-preventing material and optionally a cross-linking agent.

2. Description of the Related Art

A lining of a fluororubber can be formed on a substrate by various methods. For example, it can be formed by laminating a compounded sheet on the substrate followed by cross-linking, by applying a solution type coating on the substrate and cross-linking the fluororubber or by applying an aqueous emulsion type coating on the substrate and cross-linking the fluororubber. However, each of these methods has its own drawbacks and it is highly desired to improve the methods for forming fluororubber linings onto a substrate.

In the case of the compounded sheet, the film has sufficient thickness but it cannot be applied on a substrate having a complicated shape. Although the solution or emulsion type coating can be applied on the substrate having the complicated shape, the formed film cannot be made sufficiently thick.

SUMMARY OF THE INVENTION

An object of the present invention is to provide a fluororubber-containing coating composition which overcomes the drawbacks of the above described conventional methods for forming fluororubber linings on a substrate.

According to the present invention, there is provided a fluororubber-containing powder coating composition comprising a fluororubber, an adhesion-preventing material and optionally a cross-linking agent, which composition has an particle size of 10 to 2,000 μm and an apparent density of at least 0.2 g/cc.

DETAILED DESCRIPTION OF THE INVENTION

A "fluororubber" herein used is intended to define a fluorine-containing polymer which has a glass transition temperature of not higher than 10° C. and rubbery elasticity at room temperature. In the present invention, any of the conventionally known fluororubbers may be used.

Specific examples of these fluororubbers are vinylidene fluoride/hexafluoropropylene copolymers, vinylidene fluoride/tetrafluoroethylene/hexafluoropropylene copolymers, vinylidene fluoride/chlorotrifluoroethylene copolymers, tetrafluoroethylene/propylene copolymers, hexafluoropropylene/ethylene copolymers, perfluoro(alkyl vinyl ether) (including those having plural ether linkages)/olefin (e.g. tetrafluoroethylene, ethylene, etc.) copolymers, fluorosilicone polymers, fluorophosphazene polymers and the like. Some of the fluororubber may have iodine atoms and/or bromine atoms bonded to polymer chains to increase a cross-linking reactivity of the rubber. Such fluororubbers are disclosed in Japanese Patent Kokai Publication No. 125491/1978, U.S. Pat. No. 4,243,770, Japanese Patent Publication No. 4115/1978, U.S. Pat. No. 4,035,565, Japanese Patent Kokai Publication No. 2031/1984 and U.S. Pat. No. 4,501,869.

The fluororubber includes thermoplastic fluororubber. The thermoplastic fluororubber comprises at least one elastomeric polymer segment and at least one non-elastomeric polymer segment, at least one of the polymer segments being a fluorine-containing polymer segment. Preferably, the thermoplastic fluororubber comprises the elastomeric polymer segment(s) and the non-elastomeric polymer segment(s) in a weight ratio of 40:60 to 95:5.

A preferred example of the thermoplastic fluororubber is a fluororubber comprising a polymer chain consisting of two or three polymer segments, an iodine atom bonded to one end of the polymer chain and a residue which has been formed by removing the iodine atom from an iodide compound and is bonded to the other end of the polymer chain, one of which segments (when the polymer chain consists of two segments) or one or two of which segments (when the polymer chain consists of three segments) is or are one or two elastomeric polymer segments having a molecular weight of 30,000 to 1,200,000 selected from the group consisting of (1) vinylidene fluoride/hexafluoropropylene of pentafluoropropylene/tetrafluoroethylene (molar ratio of 45–90:5–50:0–35) polymer and (2) perfluoro($C_1$-$C_3$-alkyl vinyl ether) (including those having plural ether linkages)/tetrafluoroethylene/vinylidene fluoride (molar ratio of 15–75:0–85:0–85) polymer, the remaining segment(s) is or are one or two non-elastomeric polymer segments having a molecular weight of 3,000 to 400,000 selected from the group consisting of (3) vinylidene fluoride/tetrafluoroethylene (molar ration of 0–100:0–100) polymer and (4) ethylene/tetrafluoroethylene/hexafluoropropylene, 3,3,3-trifluoropropylene-1, 2-trifluoromethyl-3,3,3-trifluoropropylene-1 or perfluoro($C_1$-$C_3$-alkyl vinyl ether) (including those having plural ether linkages) (molar ration of 40–60:60–40:0–30) polymer, a weight ration of the elastomeric polymer segment(s) and the non-elastomeric polymer segment(s) being from 40:60 to 95:5.

The preferred examples of the thermoplastic fluororubber are described in Japanese Patent Publication No. 4728/1983 and U.S. Pat. No. 4,158,678.

The coating composition of the present invention may be cross linked by a conventional cross-linking method, such as amine cross-linking, polyol cross-linking, peroxide cross-linking or by irradiation.

When the coating composition of the present invention is cross linked with a polyol or a peroxide, a suitable cross-linking agent is added to the composition.

In case of the amine cross-linking, a primary or secondary polyamine is used as the cross-linking agent.

In case of the polyol cross-linking, a combination of a polyol (e.g. bisphenol-A and bisphenol-AF) and a cross-linking accelerator (e.g. calcium hydroxide, barium hydroxide, guanidine and imidazole) is preferably used.

In case of the peroxide cross-linking, a peroxide having a half-life temperature in a period of 10 hours of 100° C. or higher (e.g. dicumyl peroxide, cumyl hydroperoxide and tert.-butyl peroxide) is used. The peroxide is usually used in combination with a polyfunctional compound (e.g. triallyl isocyanurate, triallylene cyanurate and diallyl phthalate).

When the powder coating composition contains the cross-linking agent and its cross-linking rate is too high, a leveling property of a coated film is deteriorated so that coating performance of the composition is decreased. On the contrary, in case of too low a cross-linking rate, a sagging of the composition is easily formed. Then, the cross-linking agent having an induction time of 5 to 30 minutes at least at 100° C. or the cross-linking agent which does not induce cross-linking at a temperature of 100° to 130° C. but quickly induces cross-linking when the temperature is increased by 20° to 50° C. From this standpoint, the peroxide cross-linking is most preferred, and the polyol cross-linking and the amine cross-linking are less preferred in this order.

The radiation cross-linking is effected after leveling or on a processed article.

When a thermoplastic fluororubber is used as the fluororubber, no cross-linking is necessary. The thermoplastic fluororubber is heated to a plastic state, coated on a substrate and cooled to form a hardened film.

As the adhesion-preventing material, any of the conventional additives such as a plasticizer, a bulk filler, a coloring agent, an acid acceptor and the like may be used.

Examples of the plasticizer are calcium stearate, magnesium stearate, dioctyl phthalate, dicresyl phthalate and the like. Examples of the bulk filler are inorganic salts (e.g. barium sulfate and calcium carbonate) and carbonaceous materials (e.g. carbon black and graphite). Examples of the coloring agent are metal oxides such as titanium oxide, iron oxide and molybdenum oxide. Examples of the acid acceptor are magnesium oxide, calcium oxide and lead oxide.

The powder of the coating composition of the present invention preferably has an average particle size of 10 to 2,000 $\mu$m. When the average particle size is larger than 2,000 $\mu$m, the coated film has poor surface properties (surface smoothness). When it is less than 10 $\mu$m, the content of the adhesion-preventing material increases so that physical properties of the coated film (e.g. rubbery elasticity and chemical resistance) are deteriorated.

In case of the powder coating composition to be used in electrostatic powder coating, the powder has an average particle size of 10 to 150 $\mu$m, preferably 20 to 100 $\mu$m. In case of a fluidized bed coating, the powder has an average particle size of 100 to 300 $\mu$m. In case of rotolining or rotomolding, the powder has an average particle size of 150 to 2,000 $\mu$m, preferably 150 to 1,000 $\mu$m.

The average particle size of the powder is determined according to ASTM D-1457 and D-1921-63 as follows:

An amount of the powder is sieved by a ro-tap shaker through a series of piled up sieves having meshes which differ from one another. From the mesh size and the cumulative remaining percentage, which is calculated from a weight of the powder remaining on each sieve, the average particle size of the powder is determined by means of a logarithmic normal probability paper.

The powder preferably has an apparent density of at least 0.2 g/cc. When the apparent density is less than 0.2 g/cc, deaeration during the formation of the film is difficult, which causes foaming. There is no specific upper limit of the apparent density. Generally, it does not exceed 1.48 g/cc. The apparent density of the powder is measured according to JIS K 6891.

The powder coating composition of the present invention can be prepared by various methods. For example, the fluororubber and optionally the filler and the cross-linking agent are homogeneously mixed by a mixing apparatus such as a calender roll and a kneader and comminuted by a suitable apparatus such as a cutter mill, a jet mill and a hammer mill. The powder can be prepared by comminuting the fluororubber in a solvent which does not solubilize but swells the fluororubber. Also, the powder can be prepared by spray drying an aqueous dispersion or a non-aqueous solution of the fluororubber. Alternatively, the powder can be prepared by coagulating the fluororubber from an aqueous dispersion of the fluororubber and separating and fluidization drying the coagulated fluororubber. Preferably, the powder is prepared by freeze pulverization.

The adhesion-preventing material is applied on the comminuted fluororubber by mixing the material with a conventional apparatus such as a twin-cylinder mixer and a spiral agitator, a marine propeller stirrer.

The amount of the adhesion-preventing material is from 0.05 to 10% by weight based on the weight of the fluororubber.

Processing conditions for the powder coating composition of the present invention varies with the application methods. Generally, the following conditions are employed:

In the case of the electrostatic powder coating, the powder coating composition is electrostatically deposited on a substrate while applying a voltage of 10 to 80 KV, leveled at a temperature of 60° to 130° C. and then cross linked at a temperature of 140° to 200° C. to form a homogeneous coated film. In the case of fluidized bed coating, after the substrate to be coated is pre-heated to a temperature of 100° to 130° C., the powder coating composition is melt coated on the heated substrate followed by leveling and cross-linking as in case of the electrostatic powder coating. In the case of the rotolining or rotomolding, the powder coating composition is filled in a mold or deposited on a substrate and gradually heated to a cross-linking temperature to effect leveling and cross-linking while rotating the mold or the substrate.

The thickness of the coated film or the molded article which is formed from the powder coating composition of the present invention is usually from 50 $\mu$m to 10 mm. If desired, a film having a thickness of 10 mm or larger may be formed.

Since the applied composition is to be leveled during processing, preferably the fluororubber to be used has a Mooney viscosity $ML_{1+10}$ (measured after one minute holding and then ten minutes rotation) of 200 or less, preferably 150 or less at 100° C. The Mooney viscosity is measured according to JIS K 6300. When the fluororubber has a Mooney viscosity ($ML_{1+10}$) larger than 200, the balance between the leveling and the cross-linking is lost when the temperature is raised to effect the leveling so that the leveling of the coated composition is deteriorated. In view of the sag problem or storage stability of the coating composition, the fluororubber preferably has a Mooney viscosity $ML_{1+10}$ of 20 or larger at 60° C.

Preferably, the powder coating composition of the present invention has an angle of repose of 20° to 60°. The angle of repose is defined as an angle between a horizontal plane and a ridge of piled powder which is formed by dropping an amount, usually about 100 ml of the powder from a height of 5 cm on a sheet of paper. When the angle of repose exceeds 60°, irregularity in the coated film tends to appear. When said angle is less than 20°, an excess of adhesion-preventing material is trapped by the fluororubber and as a result, would adversely affect the properties of the coating composition.

PREFERRED EMBODIMENTS OF THE INVENTION

The present invention will be explained in greater detail by the following Examples. The "parts" and "%" are by weight unless otherwise indicated.

The compounds of the fluororubber used in Examples have following composition:

| Component | Parts |
| --- | --- |
| Compound 1: | |
| Daiel G-902 | 100 |
| (Vinylidene fluoride/hexafluoro-propylene/tetrafluoroethylene copolymer manufactured by Daikin Industries, Ltd.) | |
| Medium thermal carbon | 20 |
| Perhexa-2,5-B | 1.5 |
| (Peroxide compound manufactured by Nippon Oil & Fat Co., Ltd.) | |
| Triallyl isocyanurate | 4 |
| [$ML_{1+10}$ (100° C.) = 30] | |
| Compound 2: | |
| Daiel G-704 | 100 |
| (Vinylidene fluoride/hexafluoro-propylene copolymer manufactured by Daikin Industries, Ltd.) | |
| Medium thermal carbon | 20 |
| MgO | 3 |
| Ca(OH)$_2$ | 6 |
| [$ML_{1+16}$ (100° C.) = 80] | |
| Compound 3: | |
| Daiel Perfluor GA-50 | 100 |
| (A peroxide cross-linking composition of tetrafluoroethylene/perfluoro(alkyl vinyl ether) copolymer manufactured by Daikin Industries, Ltd.) | |
| [$ML_{1+10}$ (100° C.) = 10] | |
| Compound 4: | |
| Tetrafluoroethylene/propylene copolymer (Molar ratio of 55:45) | 100 |
| Medium-thermal carbon | 20 |
| Perhexa-2,5-B | 1.5 |
| Triallyl isocyanurate | 4 |
| [$ML_{1+10}$ (100° C.) = 30] | |

Example 1

The fluororubber composition of Compound 1 was pulverized with a cutter mill at −80° C. and the surfaces of the powder particles of the pulverized fluororubber composition were coated with 0.5% of barium sulfate based on the weight of the fluororubber composition. Then, the powder was sieved to obtain a powder composition having an average particle size of 50 μm and an apparent density of 0.45 g/cc.

The powder was electrostatically coated on a steel plate (100 mm×150 mm×2 mm) at an applied voltage of 40 KV and then heated at 100° C. for 15 minutes. The electrostatic powder coating and heating were repeated two more times and the coated steel plate was finally baked in the air at 100° C. for 30 minutes and in a nitrogen stream at 160° C. for 60 minutes to cure the fluororubber. Thereby, a smooth coated film of about 5 mm in thickness containing no bubbles was formed.

Example 2

The fluororubber composition of Compound 2 was pulverized and sieved in the same manner as in Example 1 to obtain a powder composition having an average particle size of 40 μm and an apparent density of 0.42 g/cc.

The powder was electrostatically coated on a steel plate (100 mm×150 mm×2 mm) at an applied voltage of 40 KV and then heated at 120° C. for 15 minutes. The electrostatic powder coating and heating were repeated three more times and the coated steel plate was finally baked in the air at 120° C. for 30 minutes and in a nitrogen stream at 160° C. for 60 minutes to cure the fluororubber. Thereby, a homogeneous coated film of about 4 mm in thickness was formed.

Example 3

The fluororubber composition of Compound 3 was pulverized and sieved at −120° C. in the same manner as in Example 1 to obtain a powder composition having an average particle size of 55 μm and an apparent density of 0.53 g/cc.

In the same manner as in Example 1 but changing the leveling temperature to 80° C. and using the above powder, a homogeneous coated film of about 5 mm in thickness was formed on the steel plate.

Example 4

In the same manner as in Example 1 but using the fluororubber composition of Compound 4, the powder having an average particle size of 45 μm was obtained. From this powder, a homogeneous coated film of about 4.5 mm in thickness was formed on the steel plate.

Example 5

Among the sieved powder obtained in Example 1, that having the particle size of 100 to 200 μm and the apparent density of 0.65 g/cc was charged in a fluidized bed coating tank and fluidized with air blow. In the fluidized powder, a steel plate (100 mm×150 mm×5 mm) which was preheated at 120° C. was dipped for 1 minute. After blowing off excess powder with an air gun, the coated steel plate was baked at 120° C. for 10 minutes. The blowing off with the air gun and baking of the dipped coating were repeated two more times. Finally, the coated composition was leveled at 120° C. for 20 minutes and then cured in the nitrogen stream at 160° C. for 60 minutes. Thereby, a smooth coated film of about 5.5 mm in thickness containing no bubbles was produced.

Example 6

Among the sieved powder in Example 1, that having the particle size of 200 to 1,000 μm and the apparent density of 0.90 g/cc (1,800 g) was charged in a mold having an interior space of 3 liters the inner wall of which was coated with a silicone type mold release agent and molded in a nitrogen stream while double axially rotating the mold. During molding, the temperature was raised at a rate of 5° C./min. to 180° C. and kept at that temperature for 20 minutes followed by cooling. Then, the molded article was removed from the mold to obtain a 3 liter container having a wall thickness of about 10 mm.

Physical properties (tensile strength, elongation, tear strength and hardness) and chemical resistance of the films or the molded article produced in Examples 1–6 were measured.

The chemical resistance was evaluated by measuring a volume increase after dipping the films or the article in each chemical in comparison with the volume before dipping. The volume increase of less than 5% is marked "O", and that of 10% or larger is marked "X".

The results are shown in Table.

TABLE

| | Example No. | | | | | |
|---|---|---|---|---|---|---|
| | 1 | 2 | 3 | 4 | 5 | 6 |
| Physical properties | | | | | | |
| Tensile strength (MPa) | 18.5 | 15.0 | 11.0 | 12.0 | 18.0 | 18.5 |
| Elongation (%) | 350 | 290 | 550 | 200 | 360 | 330 |
| Tear strength (KN/m) | 20 | 21 | 18 | 15 | 20 | 19 |
| Hardness | 71 | 71 | 69 | 76 | 71 | 72 |
| Chemical resistance | | | | | | |
| Sulfuric acid (90%) (80° C. × 70 hrs) | O | O | O | O | O | O |
| Sodium hydroxide (20%) (80° C. × 70 hrs) | O | O | O | O | O | O |
| Gasoline (40° C. × 70 hrs) | O | O | O | X | O | O |
| Methanol (40° C. × 70 hrs) | O | X | O | X | O | O |

Example 7

As a fluororubber powder, the thermoplastic fluororubber Daiel Thermoplastic T-630 (manufactured by Daikin Industries, Ltd., $ML_{1+10}=180$) was used and treated with calcium stearate to obtain a powder composition having a particle size of 20 to 100 μm and an apparent density of 0.47 g/cc. In the same manner as in Example 1, the obtained powder was electrostatically coated on the steel plate and heated at 200° C. repeatedly. Then, the coated film was leveled at 190° C. for 20 minutes to obtain a homogeneous film of 3 mm in thickness.

What is claimed is:

1. A method for coating an article with a fluororubber comprising the steps of:

applying on a substrate a fluororubber-containing powdery composition, which is prepared by freeze pulverization, comprising 0.05 to 10% by weight based on the weight of the fluororubber of at least one adhesion-preventing material selected from the group consisting of a plasticizer, a bulk filler, a coloring agent and an acid acceptor and optionally a cross-linking agent, which composition has a particle size of 10 to 2,000 μm and an apparent density of at least 0.2 g/cc and an angle of repose of 20° to 60° C., wherein said fluororubber is selected from the group consisting of vinylidene fluoride/hexafluoropropylene copolymers, vinylidene fluoride/tetrafluoroethylene/hexafluoropropylene copolymers, tetrafluoroethylene/propylene copolymers, hexafluoropropylene/ethylene copolymers, perfluoro(alkyl vinyl ether)/olefin copolymers, and fluorosilicone polymers; and heating said composition at 60° to 130° C. to effect leveling of said composition, and optionally heating said composition at 140° to 200° C. to crosslink the fluororubber, wherein said substrate is not deformed at the highest temperature of the above leveling and crosslinking temperatures.

2. The method according to claim 1, wherein the fluororubber-containing composition is applied on the substrate by an electrostatic powder coating method.

3. The method according to claim 1, wherein the fluororubber-containing composition is applied on the substrate by fluidized bed coating.

4. The method according to claim 1, wherein the fluororubber-containing composition is applied on the substrate by rotolining or rotomolding.

5. The method according to claim 1, wherein the fluororubber has a glass transition temperature of not higher than 10° C.

6. The method according to claim 1, wherein the adhesion-preventing material is selected from a plasticizer, a bulk filler, a coloring agent or an acid acceptor.

7. The method according to claim 6, wherein the adhesion-preventing material is a plasticizer selected from calcium stearate, magnesium stearate, dioctyl phthalate or dicresyl phthalate.

8. The method according to claim 6, wherein the adhesion-preventing material is a bulk filler selected from an inorganic salt or a carbonaceous material.

9. The method according to claim 6, wherein the adhesion-preventing material is a bulk filler selected from barium sulfate, calcium carbonate, carbon black or graphite.

10. The method according to claim 6, wherein the adhesion-preventing material is a metal oxide coloring agent.

11. The method according to claim 6, wherein the adhesion-preventing material is a coloring agent selected from titanium oxide, iron oxide or molybdenum oxide.

12. The method according to claim 6, wherein the adhesion-preventing material is an acid acceptor selected from magnesium oxide, calcium oxide or lead oxide.

* * * * *